UNITED STATES PATENT OFFICE.

HELEN L. MACKER, OF BOSTON, MASSACHUSETTS.

IMPROVEMENT IN AMALGAMS FOR COATING HARNESS-TRIMMINGS, &c.

Specification forming part of Letters Patent No. 123,712, dated February 13, 1872.

Specification describing a certain Compound, invented by HELEN L. MACKER, of Boston, in the county of Suffolk and State of Massachusetts, termed "Macker Silver," to be used in the place of silver-plated saddlery, hardware, &c.

The nature of the invention consists in mixing zinc, quicksilver, shellac, and resin, in the proportions described below, to be used instead of silver-plated saddlery, hardware, hubs of wheels and other parts of vehicles which may be plated; also for various other purposes, in place of other silver-plated ware, as may be deemed expedient.

To prepare my composition, take three pounds zinc, one ounce quicksilver, one-fourth pound white shellac, and one-fourth pound white resin, and mix by melting.

The advantages over silver-plated ware is that it retains its silvery appearance while the metal or composition lasts. Silver-plating, of course, wears off in time.

My composition resembles silver very much, and burnishes very finely. If my composition needs to be a little harder, as may be sometimes the case, I add one-fourth pound nickel to the composition above described.

I claim as my invention—

The above-described compound, which I term "Macker silver," substantially in the proportions and for the purpose set forth.

HELEN L. MACKER.

Witnesses:
    HENRY W. WILLIAMS,
    B. W. WILLIAMS.